(12) United States Patent
Ptasinski et al.

(10) Patent No.: US 7,459,324 B1
(45) Date of Patent: Dec. 2, 2008

(54) METAL NANOPARTICLE PHOTONIC BANDGAP DEVICE IN SOI METHOD

(75) Inventors: Joanna N. Ptasinski, San Diego, CA (US); John Scott Rodgers, San Diego, CA (US); Stephen Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/844,192

(22) Filed: Aug. 23, 2007

Related U.S. Application Data

(63) Continuation-in-part of application No. 11/653,740, filed on Jan. 16, 2007, now Pat. No. 7,336,882, which is a continuation-in-part of application No. 11/332,437, filed on Jan. 13, 2006, now Pat. No. 7,194,175.

(51) Int. Cl.
*H01L 21/20* (2006.01)

(52) U.S. Cl. .......................... 438/31; 385/131; 977/773; 359/321

(58) Field of Classification Search .................... 438/28, 438/31, 479; 359/321, 333, 344; 385/129–132, 385/14; 977/773–775
See application file for complete search history.

(56) References Cited

U.S. PATENT DOCUMENTS

| | | | | |
|---|---|---|---|---|
| 6,358,854 | B1 * | 3/2002 | Fleming et al. | 438/692 |
| 6,366,392 | B1 * | 4/2002 | Tokushima | 359/321 |
| 6,466,360 | B2 * | 10/2002 | Tokushima | 359/321 |
| 6,597,851 | B2 * | 7/2003 | Johnson et al. | 385/131 |
| 6,671,443 | B2 * | 12/2003 | Deliwala | 385/125 |
| 6,821,903 | B2 * | 11/2004 | Cotteverte et al. | 438/706 |
| 6,869,881 | B2 * | 3/2005 | Deliwala | 438/689 |
| 6,936,854 | B2 * | 8/2005 | Iwasaki et al. | 257/81 |
| 7,177,021 | B2 * | 2/2007 | Wang et al. | 356/301 |
| 7,194,175 | B1 * | 3/2007 | Rodgers et al. | 385/131 |
| 7,274,849 | B2 * | 9/2007 | Nobayashi et al. | 385/131 |

* cited by examiner

*Primary Examiner*—Savitri Mulpuri
(74) *Attorney, Agent, or Firm*—Allan Y. Lee; Kyle Eppele

(57) ABSTRACT

A Metal Nanoparticle Photonic Bandgap Device in SOI Method (NC#098884). The method includes providing a substrate having a semiconductor layer over an insulator layer, operatively coupling the substrate to a photonic bandgap structure having at least one period, wherein the photonic bandgap structure is adapted to receive and output light along a predetermined path, and operatively coupling the photonic bandgap structure and the substrate to a metal nanoparticle structure comprising at least three metal nanoparticles having spherical shapes of different radii, wherein the at least three metal nanoparticles are adapted to receive and amplify light rays and output amplified light.

19 Claims, 14 Drawing Sheets

104

106

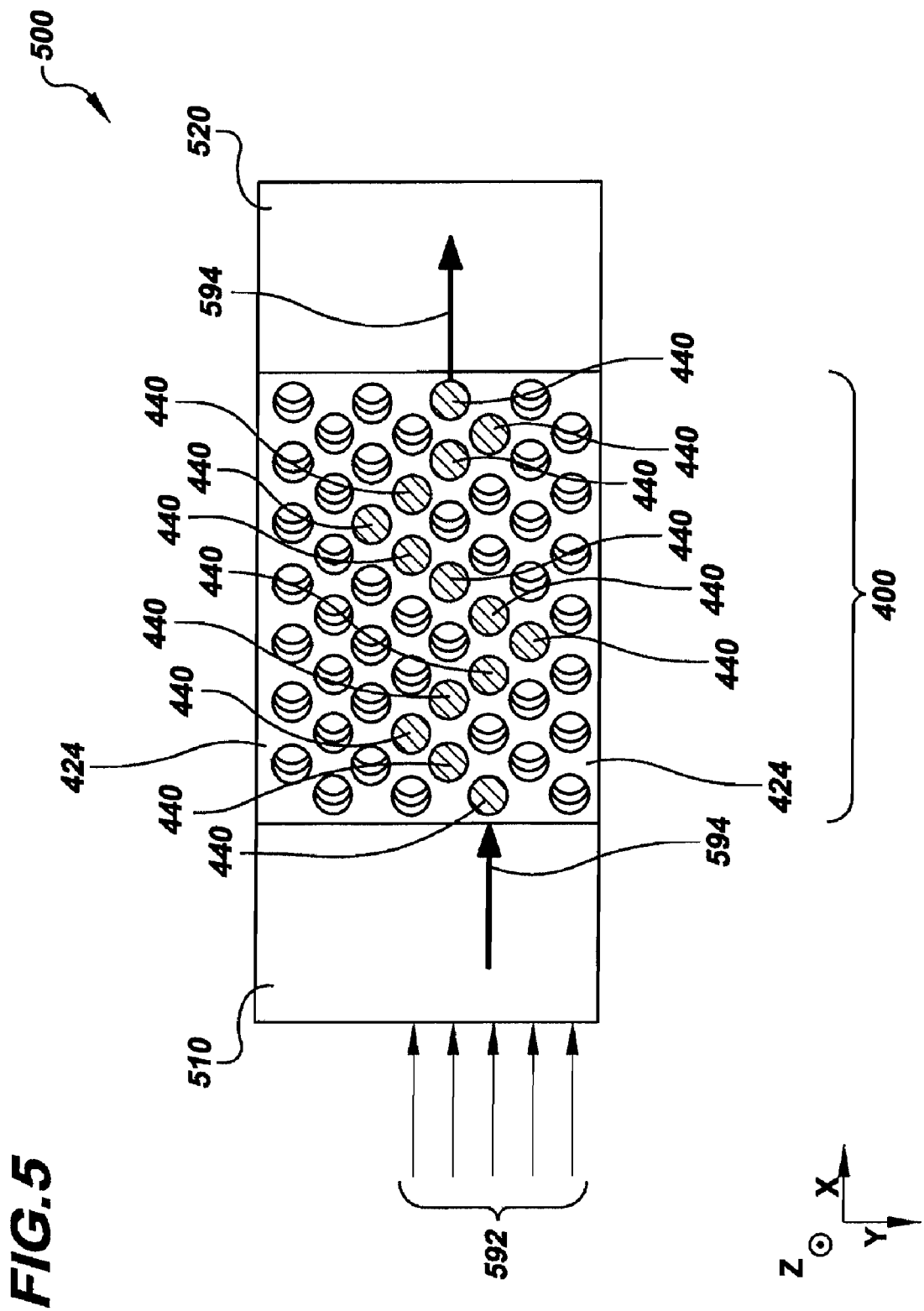

METAL NANOPARTICLE PHOTONIC BANDGAP DEVICE IN SOI METHOD

CROSS-REFERENCE TO RELATED APPLICATIONS

This application is a continuation-in-part of U.S. Ser. No. 11/653,740, entitled "Metal Nanoparticle Photonic Bandgap Device in SOI," by Ptasinski et al. filed Jan. 16, 2007 now U.S. Pat. No. 7,336,882 (NC#097882), which is a continuation-in-part of U.S. Ser. No. 11/332,437, entitled "3D Photonic Bandgap Device in SOI," by Rodgers et al. filed Jan. 13, 2006 now U.S. Pat. No. 7,194,175 (NC#097719), which are both hereby incorporated by reference herein in its entirety for its teachings on photonic bandgap devices and are hereinafter referred to as the "parent application" and "grandparent application," respectively.

FEDERALLY SPONSORED RESEARCH AND DEVELOPMENT

This invention (Navy Case No. 098884) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 098884.

This application is related to U.S. Pat. No. 6,597,851 B2, entitled "Periodic Dielectric Structure Having a Complete Three-Dimensional Photonic Band Gap," by Johnson et al. issued Jul. 22, 2003, which is hereby incorporated by reference herein in its entirety for its teachings on photonic bandgap devices and is hereinafter referred to as the "Johnson patent."

BACKGROUND OF THE INVENTION

The Metal Nanoparticle Photonic Bandgap Device in SOI Method is generally in the field of photonic bandgap devices.

Typical photonic bandgap devices receive unamplified light from a light source on SOI (semiconductor on insulator).

A need exists for photonic bandgap devices that receive amplified light.

BRIEF DESCRIPTION OF THE DRAWINGS

FIG. 5 is a top view of an embodiment of a metal nanoparticle photonic bandgap device in SOI.

DETAILED DESCRIPTION OF THE INVENTION

Described herein is Metal Nanoparticle Photonic Bandgap Device in SOI Method.

DEFINITIONS

The following acronyms are used herein:

Acronym(s):

3D —three dimensional

MNP—Metal Nanoparticle

PBG—Photonic Bandgap

SOI—Semiconductor on Insulator

The 3D photonic bandgap (PBG) device in SOI (semiconductor on insulator) includes a 3D PBG structure fabricated in SOI. In one embodiment, the present 3D PBG device in SOI includes a 3D PBG structure having one period in a selected axis. In one embodiment, the present 3D PBG device in SOI includes a 3D PBG device having a funnel-shaped waveguide. In one embodiment, the present 3D PBG device in SOI includes a 3D PBG device monolithically fabricated with at least one electronic component in SOI.

Figure 1A:
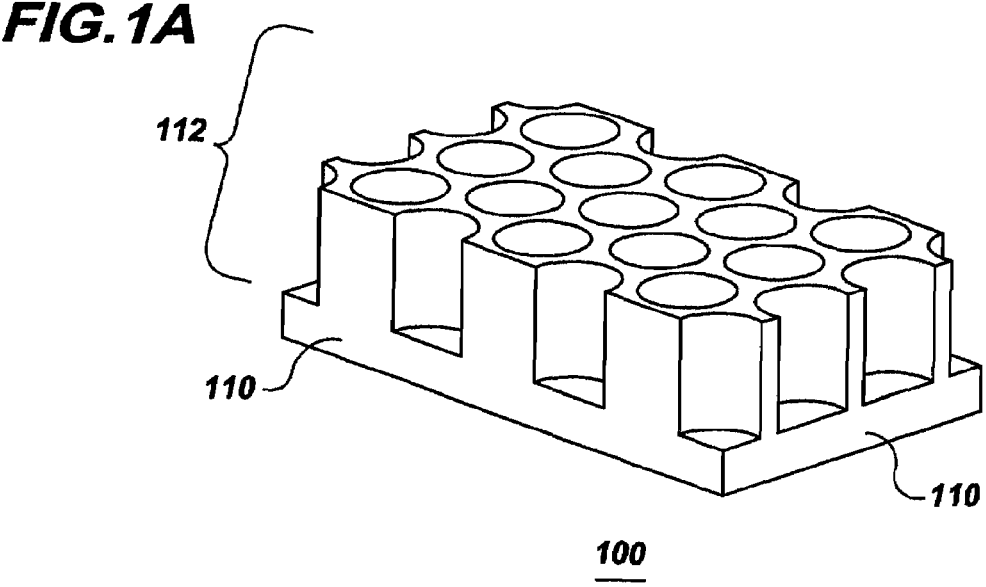
FIG. 1A is a perspective view of one embodiment of a 3D photonic bandgap device.
Figure 1B:
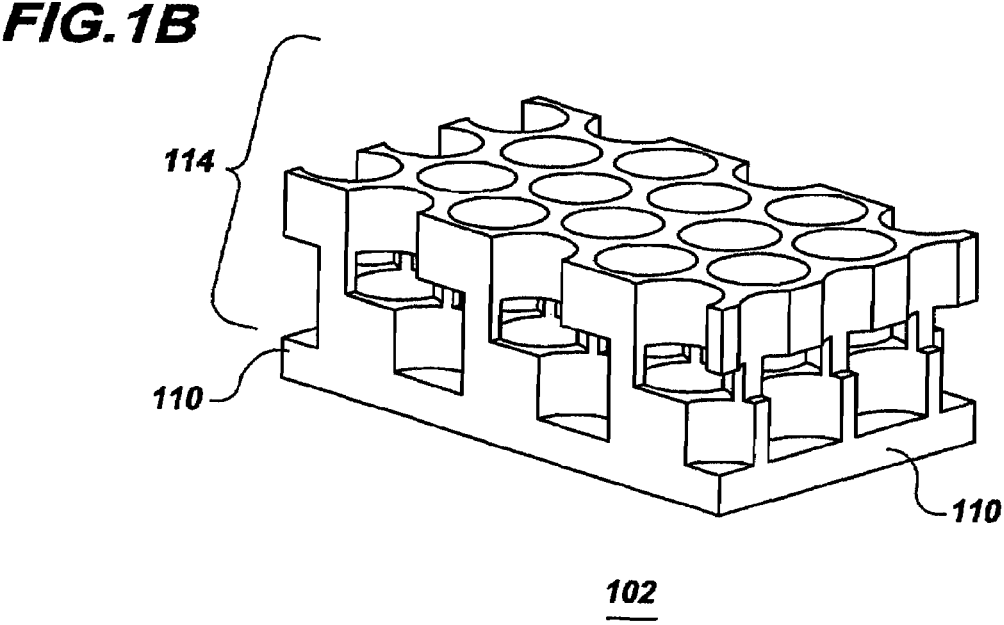
FIG. 1B is a perspective view of one embodiment of a 3D photonic bandgap device.
Figure 1C:
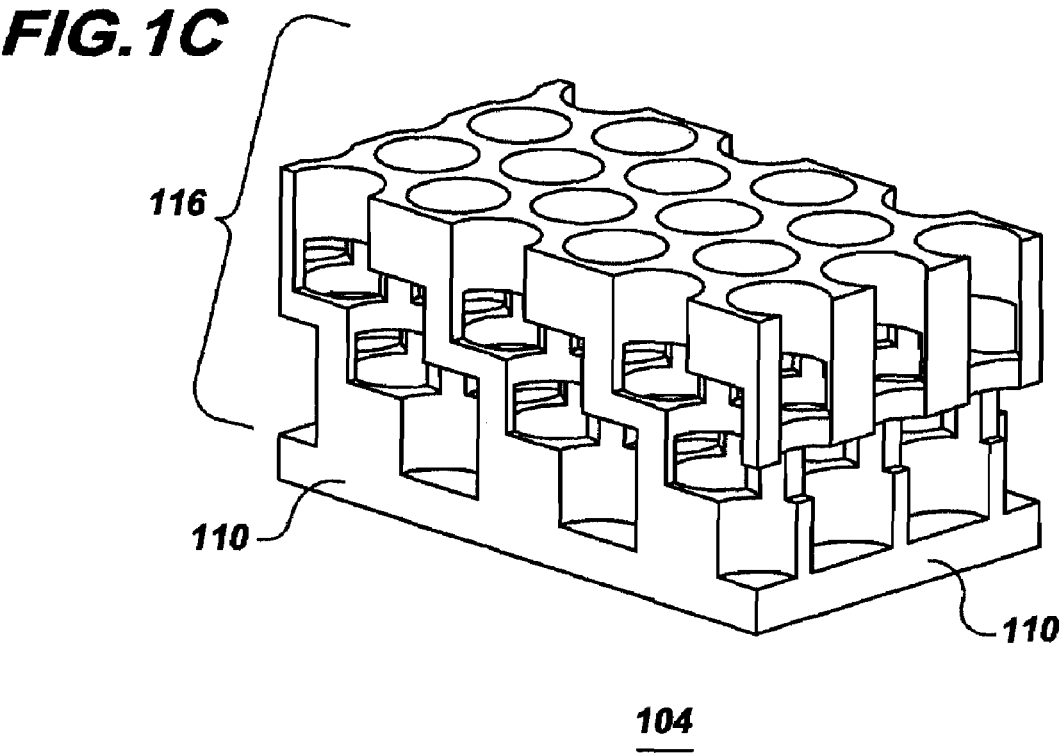
FIG. 1C is a perspective view of one embodiment of a 3D photonic bandgap device.

FIGS. 1A-1C are perspective views of embodiments of a 3D photonic bandgap device in intermediate stages of fabrication. FIG. 1A is a perspective view of one embodiment of a 3D photonic bandgap device in an intermediate stage of fabrication. As shown in FIG. 1A, 3D PBG device 100 includes substrate 110 and PBG structure 112. Substrate 110 comprises a semiconductor layer over an insulator layer. Exemplary semiconductor layers include silicon and germanium. Exemplary insulator layers include quartz, silicon dioxide and sapphire. In one embodiment, substrate 110 includes a silicon layer over an insulator layer. In one embodiment, substrate 110 includes a silicon layer over a quartz layer. In one embodiment, substrate 110 includes a silicon layer over a sapphire layer. PBG structure 112 comprises a honeycomb-like structure having high index regions and low index regions. The honeycomb-like structure includes cylinders having a diameter and height. In one embodiment, the low index regions of PBG structure 112 comprise air. In one embodiment, the low index regions of PBG structure 112 comprise silicon dioxide. In one embodiment, the high index regions of PBG structure 112 comprise silicon.

FIG. 1B is a perspective view of one embodiment of a 3D photonic bandgap device in an intermediate stage of fabrication. As shown in FIG. 1B, 3D PBG device 102 includes substrate 110 and PBG structure 114. Substrate 110 of FIG. 1B is substantially similar to substrate 110 of FIG. 1A, and thus, is not described hereinagain. PBG structure 114 of FIG. 1B is similar to PBG structure 112 of FIG. 1A, however, PBG structure 114 includes a second honeycomb-like structure over the first honeycomb-like structure of PBG structure 112 of FIG. 1A. The second honeycomb-like structure is offset from the first honeycomb-like structure. In one embodiment, the second honeycomb-like structure is offset from the first honeycomb-like structure by approximately one-third of a diameter of a cylinder.

FIG. 1C is a perspective view of one embodiment of a 3D photonic bandgap device in an intermediate stage of fabrication. As shown in FIG. 1C, 3D PBG device 104 includes substrate 110 and PBG structure 116. Substrate 110 of FIG. 1C is substantially similar to substrate 110 of FIG. 1A, and thus, is not described hereinagain. PBG structure 116 of FIG. 1C is similar to PBG structure 114 of FIG. 1B, however, PBG structure 116 includes a third honeycomb-like structure over the second honeycomb-like structure of PBG structure 114 of FIG. 1B. The third honeycomb-like structure is offset from the first honeycomb-like structure. In one embodiment, the third honeycomb-like structure is offset from the first honeycomb-like structure by approximately two-thirds of a diameter of a cylinder.

Figure 1D:
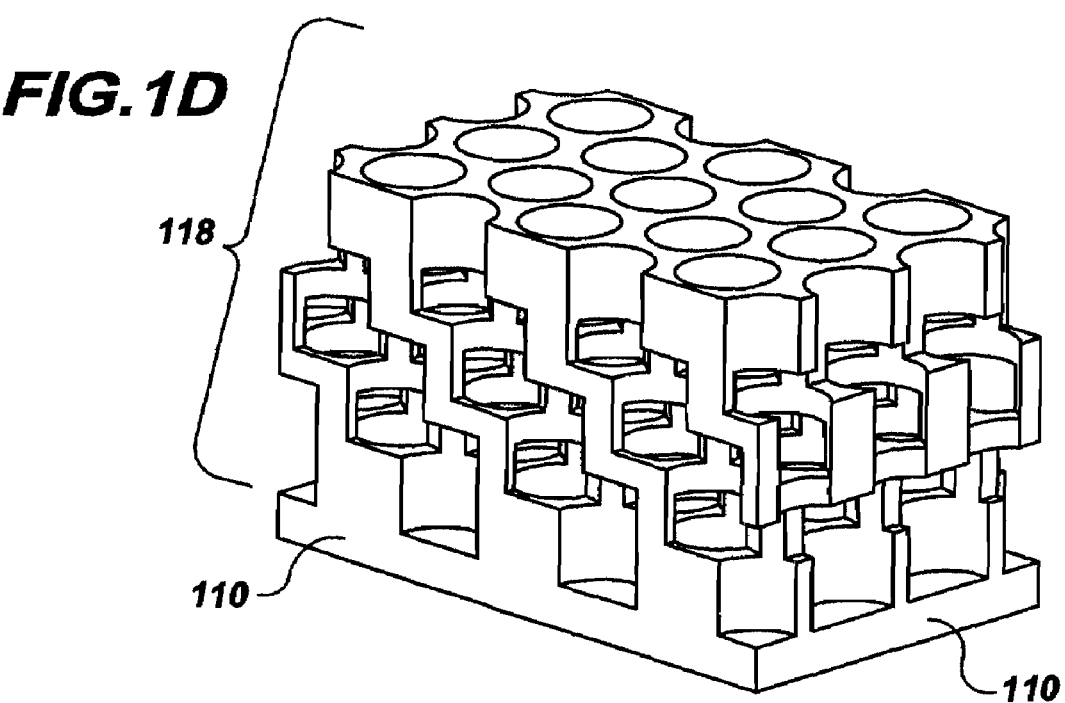
FIG. 1D is a perspective view of one embodiment of a 3D photonic bandgap device.

FIG. 1D is a perspective view of one embodiment of a 3D photonic bandgap device having one period. As shown in FIG. 1D, 3D PBG device 106 includes substrate 110 and PBG structure 118. Substrate 110 of FIG. 1D is substantially similar to substrate 110 of FIG. 1A, and thus, is not described hereinagain. PBG structure 118 of FIG. 1D is similar to PBG structure 116 of FIG. 1C, however, PBG structure 118 includes a fourth honeycomb-like structure over the third honeycomb-like structure of PBG structure 116 of FIG. 1C. The fourth honeycomb-like structure is not offset from the first honeycomb-like structure.

One method of fabricating one embodiment of a 3D photonic bandgap device follows:
  a) providing a substrate comprising a semiconductor layer over an insulator layer;
  b) fabricating a 3D photonic bandgap structure having at least one period over the substrate.

One method of fabricating one embodiment of a 3D photonic bandgap device follows:
  a) providing a substrate comprising a semiconductor layer over an insulator layer;
  b) fabricating a first layer over the substrate, wherein the first layer has periodic regions of high index and low index materials;
  c) fabricating a second layer over the first layer, wherein the second layer has periodic regions of high index and low index materials that are offset from the first layer;
  d) fabricating a third layer over the second layer, wherein the third layer has periodic regions of high index and low index materials that are offset from the first layer and the second layer;
  e) fabricating a fourth layer over the third layer, wherein the third layer has periodic regions of high index and low index materials that are offset from the second layer and the third layer, but not offset from the first layer.

Figure 2A:
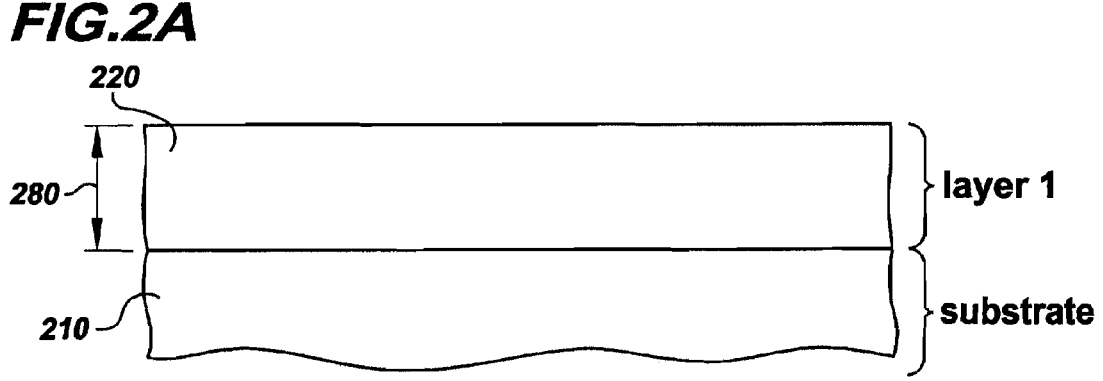
FIG. 2A is a side view of one embodiment of a 3D photonic bandgap device.

FIGS. 2A-2G are side views of one embodiment of a 3D photonic bandgap device in intermediate stages of fabrication. One method of fabricating an embodiment of a 3D PBG device (referred to hereinafter as the "monolithic fabrication method") is described below with regard to FIGS. 2A-2H. In a first event as shown in FIG. 2A, the monolithic fabrication method deposits first layer 220 over substrate 210. First layer 220 has a height 280 and comprises a semiconductor material. In one embodiment, the semiconductor material of first layer 220 comprises silicon. Substrate 210 comprises a semiconductor layer over an insulator layer. In one embodiment, the semiconductor layer of substrate 210 comprises silicon. In one embodiment, the insulator layer of substrate 210 comprises sapphire. In one embodiment, the insulator layer of substrate 210 comprises silicon dioxide.

Figure 2B:
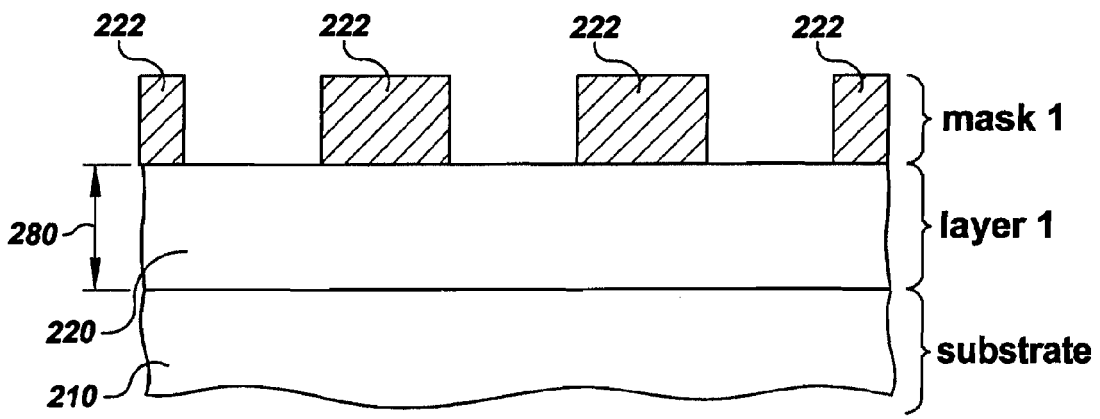
FIG. 2B is a side view of one embodiment of a 3D photonic bandgap device.
Figure 2C:
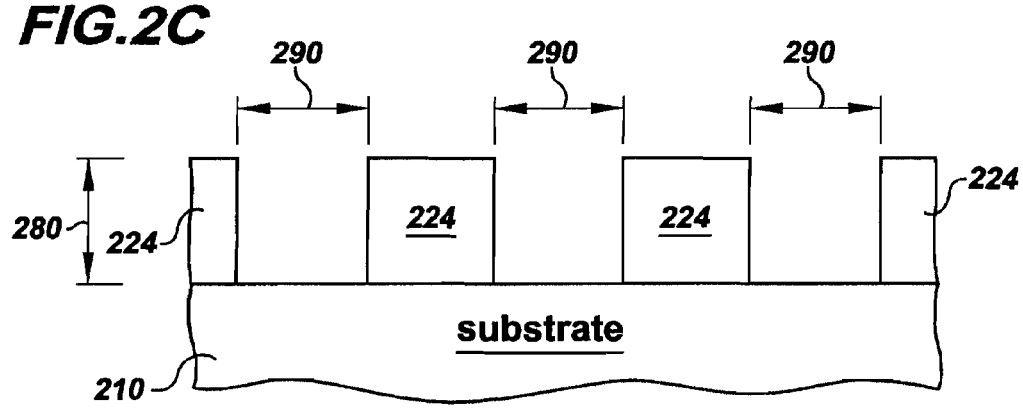
FIG. 2C is a side view of one embodiment of a 3D photonic bandgap device.
Figure 2D:
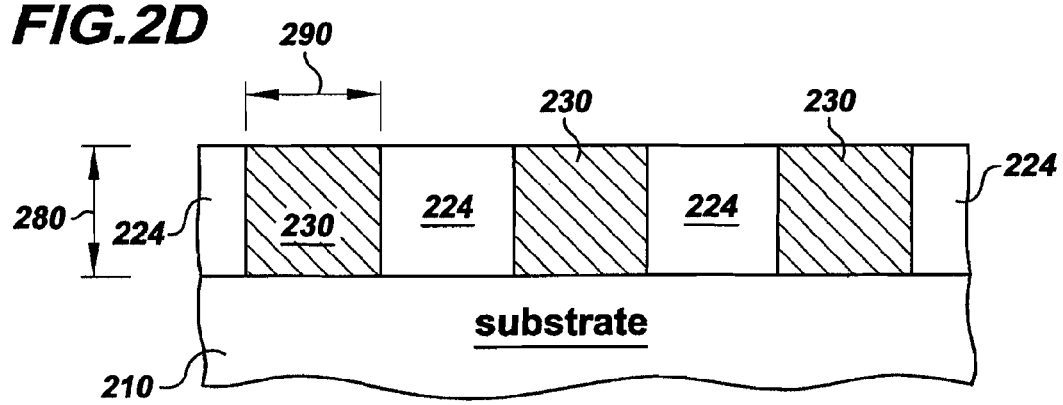
FIG. 2D is a side view of one embodiment of a 3D photonic bandgap device.

In a second event as shown in FIG. 2B, the monolithic fabrication method deposits, patterns and develops photoresist to form first photoresist mask 222 over first layer 220. In a third event as shown in FIG. 2C, the monolithic fabrication method selectively etches first layer 220 to form high index segments 224 having heights 280. High index segments 224 form apertures having diameters 290 and heights 280. In a fourth event as shown in FIG. 2D, the monolithic fabrication method deposits and planerizes a low index material over substrate 210 to form low index segments 230. In one embodiment, low index segments 230 comprise a material selected from the group consisting of silicon dioxide, oxide, polymer and a combination of two or more of the above. FIG. 2D is analogous to FIG. 1A.

Figure 2E:
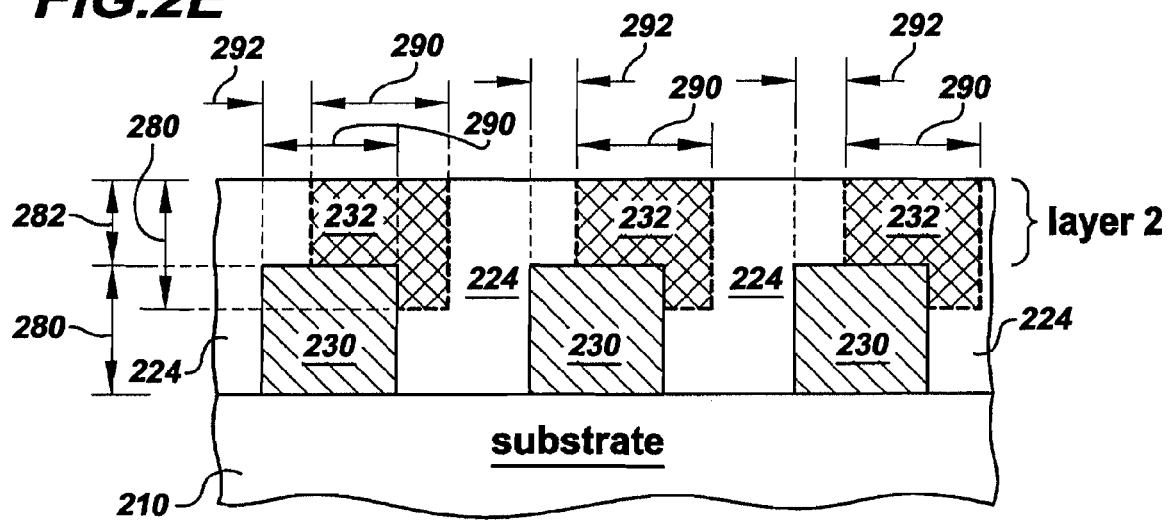
FIG. 2E is a side view of one embodiment of a 3D photonic bandgap device.

In a fifth event, the monolithic fabrication method deposits a second layer over high index segments 224 and low index segments 230. The second layer has a height 282, which is less than height 280. In one embodiment, height 282 is approximately equal to two-thirds of height 280. The second layer comprises semiconductor material such as silicon and germanium. In a sixth event, the monolithic fabrication method deposits, patterns and develops a photoresist over the second layer. In a seventh event as shown in FIG. 2E, the monolithic fabrication method selectively etches the second layer and high index segments 224 to form apertures 232. The semiconductor material of the second layer increments high index segments 224. Apertures 232 have diameters 290. Apertures 232 are offset from low index segments 230 by offset 292. Offset 292 is in at least one direction. In one embodiment, offset 292 is approximately equal to one-third of diameter 290. Apertures 232 are selectively etched into high index segments 224 to a depth approximately equal to height 280.

Figure 2F:
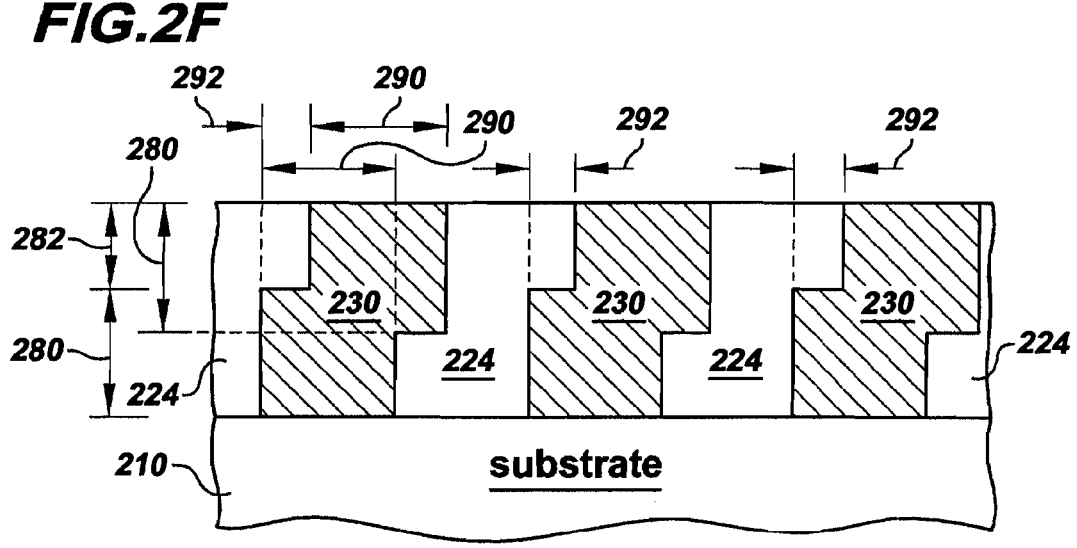
FIG. 2F is a side view of one embodiment of a 3D photonic bandgap device.
Figure 2G:
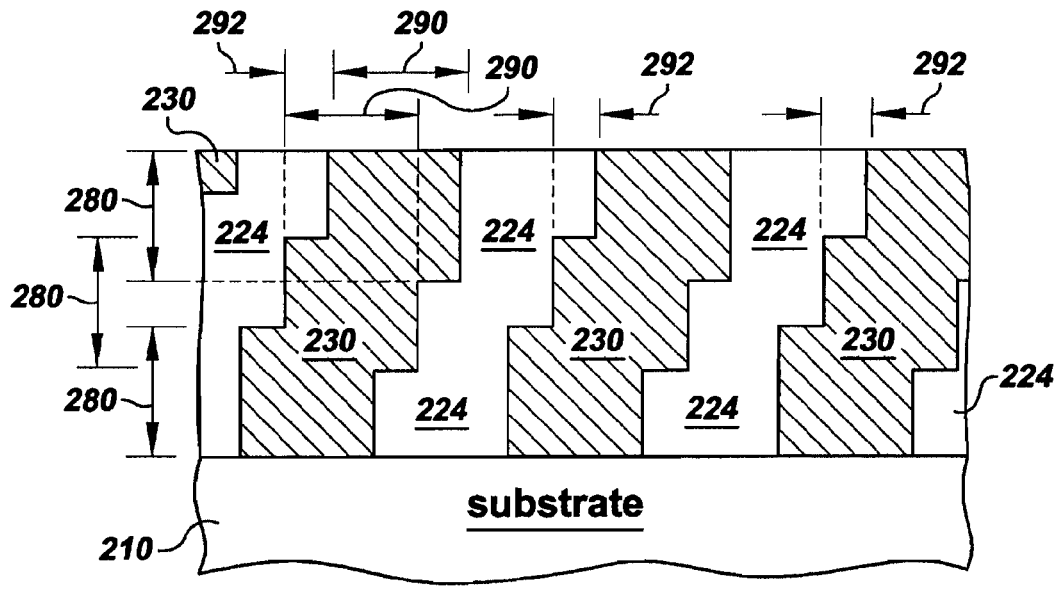
FIG. 2G is a side view of one embodiment of a 3D photonic bandgap device.

In an eighth event as shown in FIG. 2F, the monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2F is analogous to FIG. 1B. In a ninth event, the monolithic fabrication method repeats the above fifth through eighth events. Specifically, the monolithic fabrication method deposits a third layer over high index segments 224 and low index segments 230. The third layer has a height 282, which is less than height 280. In one embodiment, height 282 is approximately equal to two-thirds of height 280. The third layer comprises semiconductor material such as silicon and germanium. The monolithic fabrication method deposits, patterns and develops a photoresist over the third layer. The monolithic fabrication method selectively etches the third layer and high index segments 224 to form apertures, which have diameters 290 and are offset from the second layer low index segments by offset 292. Offset 292 is in at least one direction. In one embodiment, offset 292 is approximately equal to one-third of diameter 290. Apertures 232 are selectively etched into high index segments 224 to a depth approximately equal to height 280. The monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2G shows the 3D PBG device after the ninth event. FIG. 2G is analogous to FIG. 1C.

Figure 2H:
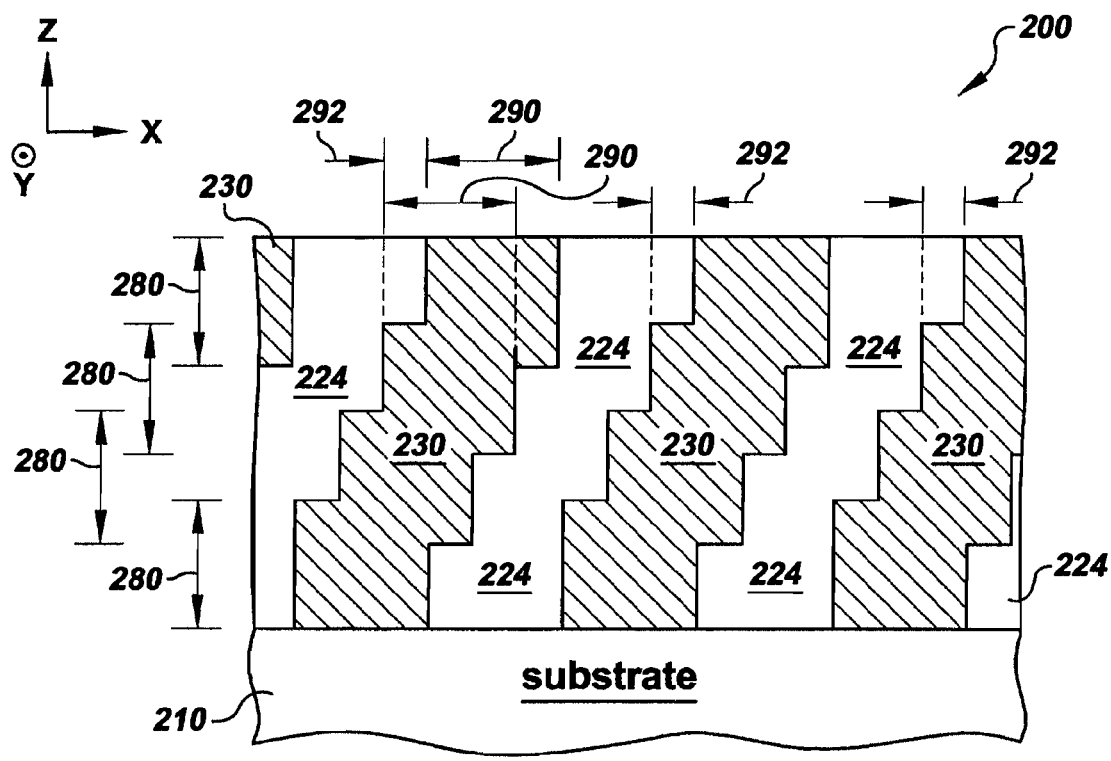
FIG. 2H is a side view of one embodiment of a 3D photonic bandgap device.

In a tenth event, the monolithic fabrication method repeats the above fifth through eighth events. Specifically, the monolithic fabrication method deposits a fourth layer over high index segments 224 and low index segments 230. The fourth layer has a height 282, which is less than height 280. In one embodiment, height 282 is approximately equal to two-thirds of height 280. The fourth layer comprises semiconductor material such as silicon and germanium. The monolithic fabrication method deposits, patterns and develops a photoresist over the fourth layer. The monolithic fabrication method selectively etches the fourth layer and high index segments 224 to form apertures, which have diameters 290 and are offset from the third layer low index segments by offset 292. The apertures are offset from the second layer low index segments by approximately two times offset 292. The apertures are not offset from the first layer low index segments. In one embodiment, offset 292 is approximately equal to one-third of diameter 290. Apertures 232 are selectively etched into high index segments 224 to a depth approximately equal to height 280. The monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2H shows the 3D PBG device after the tenth event. FIG. 2H is a side view of one embodiment of a 3D photonic bandgap device 200 in SOI having one period. FIG. 2H is analogous to FIG. 1D. In one embodiment, the monolithic fabrication method repeats the above first through tenth events until a desired number of periods is fabricated.

One method of fabricating an embodiment of a 3D PBG device (referred to hereinafter as the "Johnson patent method") is now described. In a first event, the Johnson patent method provides a substrate comprising a semiconductor layer over an insulator layer. In a second event, the Johnson patent method fabricates a 3D photonic bandgap structure having at least one period over the substrate in accordance with the methods described in the above incorporated Johnson patent. Such a 3D photonic bandgap structure is referred to hereinafter as a "rod and hole 3D photonic bandgap structure."

One method of fabricating one embodiment of a 3D photonic bandgap device follows:

a) providing a substrate comprising a semiconductor layer over an insulator layer;

b) monolithically fabricating an electronic component including the substrate and a 3D photonic bandgap structure having at least one period over the substrate.

Figure 3:
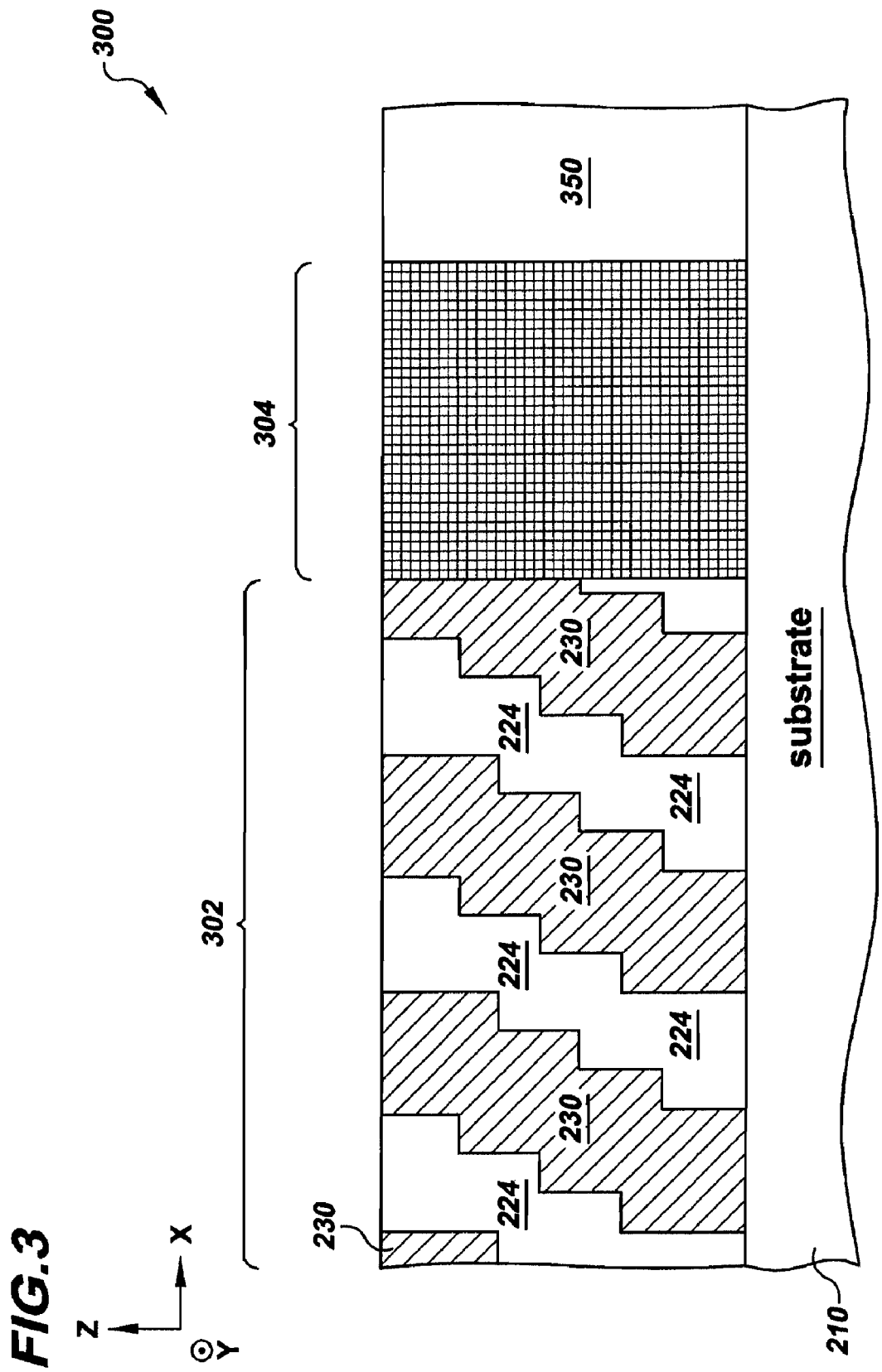
FIG. 3 is a side view of one embodiment of a 3D photonic bandgap device.

FIG. 3 is a side view of one embodiment of a 3D photonic bandgap device having one period. As shown in FIG. 3, 3D PBG device 300 includes 3D PBG structure 302, at least one electronic component 304, substrate 210 and medium 350. 3D PBG structure 302 over substrate 210 is substantially similar to 3D PBG device in SOI 200 of FIG. 2H, and thus, similar components are not described hereinagain. Exemplary electronic components of the at least one electronic component 304 include transistors, photodiodes, photodetectors, phototransistors and metal vias. Substrate 210 is described above with regard to FIG. 2A. Medium 350 may comprise metal, semiconductor or insulator material. In one embodiment, medium 350 comprises semiconductor material. In one embodiment, 3D PBG structure 302 and at least one electronic component 304 are monolithically integrated over substrate 210. In one embodiment, 3D PBG device 300 is monolithically fabricated.

Figure 4A:
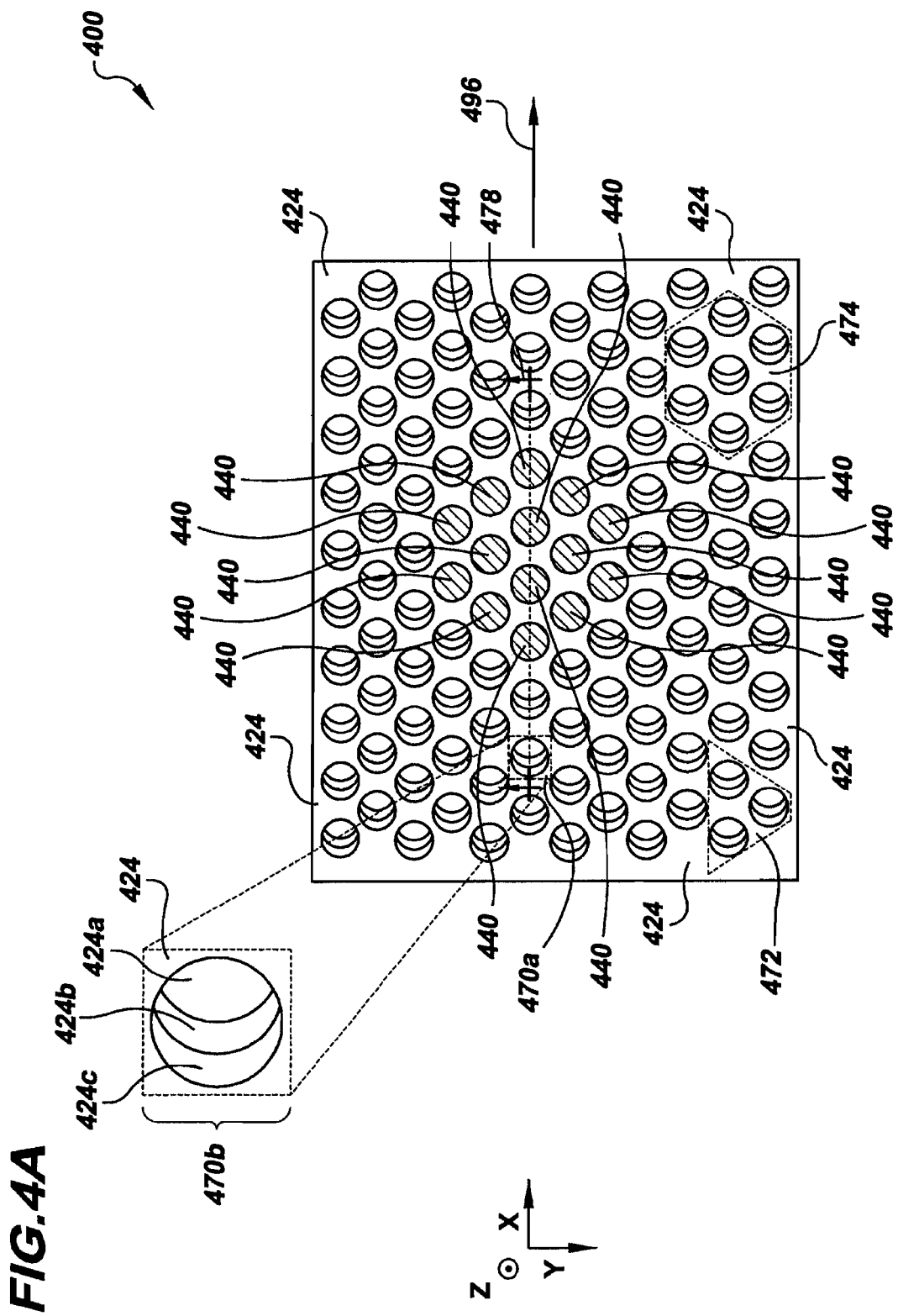
FIG. 4A is a top view of one embodiment of a 3D photonic bandgap device.
Figure 4B:
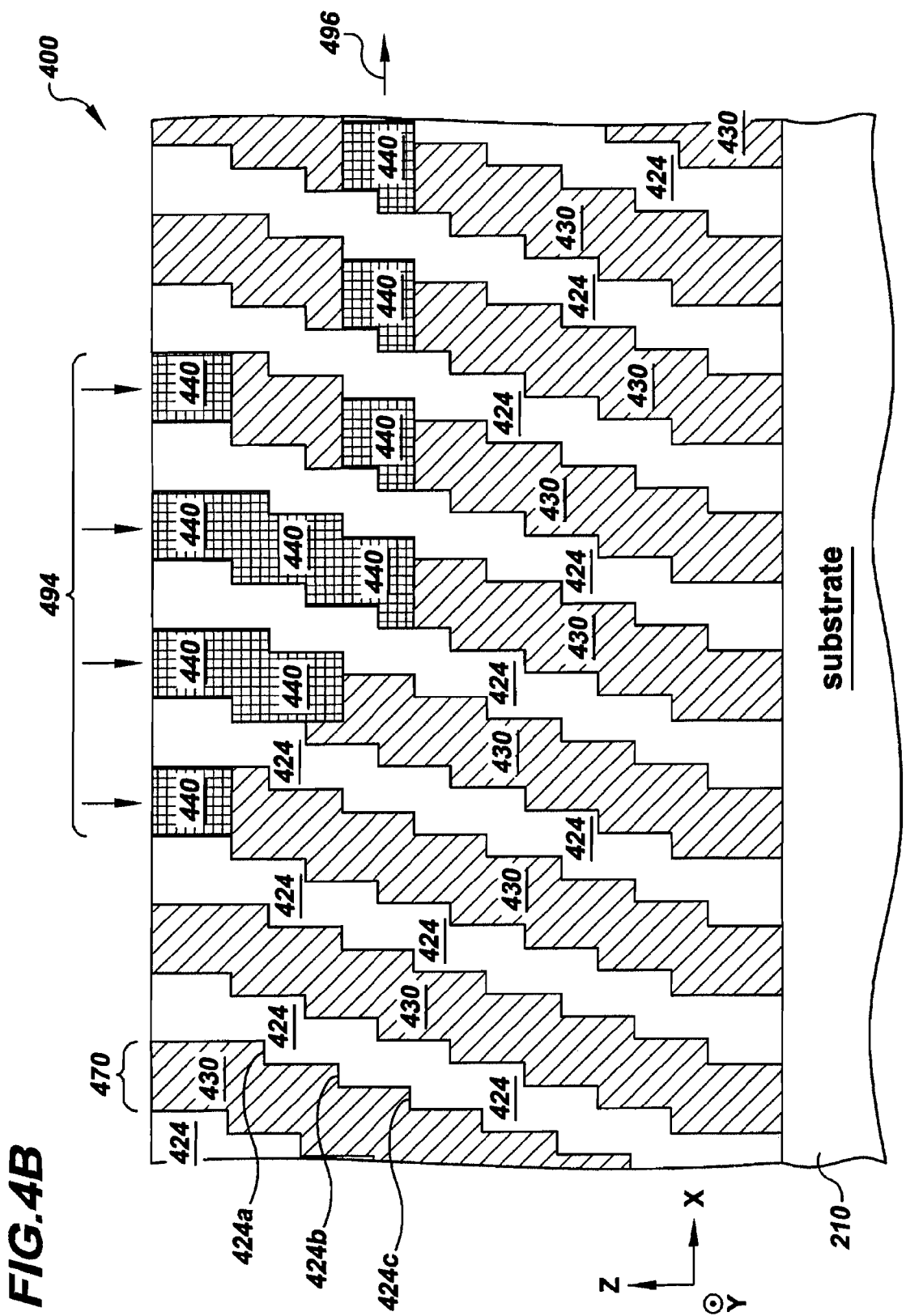
FIG. 4B is a side view of one embodiment of a 3D photonic bandgap device.

FIGS. 4A and 4B are views of an embodiment of a 3D photonic bandgap device in a funnel waveguide configuration. FIG. 4A is a top view of one embodiment of a 3D photonic bandgap device. FIG. 4B is a side view of one embodiment of a 3D photonic bandgap device as viewed across cross-section line 478 of FIG. 4A. As shown in FIGS. 4A and 4B, 3D PBG device 400 includes high index regions 424, low index regions 430 (not labeled in FIG. 4A), crystal defect regions 440 and substrate 210 (not shown in FIG. 4A). In the 3D photonic bandgap device embodiment of FIGS. 4A and 4B, low index regions 430 comprise air. Thus, as shown in FIG. 4A with reference to expanded view area 470b, high index regions 424a, 424b and 424c are visible despite having different depths relative to a top surface of 3D PBG 400. Expanded view area 470b is an expanded view of area 470a. As shown in FIG. 4B, high index region 424a has a depth less than high index region 424b, which has a depth less than high index region 424c. High index regions 424 and low index regions 430 are analogous to high index segments 224 and low index segments 230, respectively, which are described above with reference to FIGS. 2D-2H, and thus, are not described hereinagain.

Crystal defect regions 440 are regions that only allow specific frequencies of light to propagate. Crystal defect regions 440 can be fabricated by intentionally introducing defects along a photonic crystal. As shown in FIG. 4B, crystal defect regions 440 taper to form a funnel waveguide configuration coupled to a horizontal waveguide. Specifically, crystal defect regions 440 taper from a large surface area of crystal defect regions 440 to a small surface area of crystal defect regions 440 with respect to an X-Y plane moving along the negative Z axis until coupling with a horizontal waveguide formed from crystal defect regions 440. As shown in FIG. 4B, light rays 494 strike 3D PBG device 400 incident to a top surface of 3D PBG device 400. Light rays 494 propagate through crystal defect regions 440 because light rays 494 have the specific frequencies that are allowed to propagate through crystal defect regions 440. Crystal regions 440 funnel light rays 494. Light rays 494 exit 3D PBG device 400 as represented by light ray 496.

In one embodiment, 3D PGB device 400 comprises a plurality of triangular patterns of apertures. An exemplary triangular pattern 472 is shown on FIG. 4A. In one embodiment, 3D PGB device 400 comprises a plurality of center-faced hexagonal patterns of apertures. An exemplary center-faced hexagonal pattern 474 is shown on FIG. 4A.

FIG. 5 is a top view of an embodiment of a metal nanoparticle photonic bandgap device in SOI. Metal nanoparticle (MNP) photonic bandgap (PBG) device in SOI 500 includes metal nanoparticle structure 510, photonic bandgap device 400, electronic component 520 and a substrate (not shown in FIG. 5). Photonic bandgap device 400 is adapted to receive and output amplified light along a predetermined path (e.g., path along crystal defect regions 440). Photonic bandgap device 400 can comprise a 2D PBG device or a 3D PBG device. In one embodiment, photonic bandgap device 400 comprises a 3D photonic bandgap device having a funnel waveguide configuration. Metal nanoparticle structure 510 includes at least three metal nanoparticles having spherical shapes of different radii (i.e., different sizes), which are configured to amplify light from a light source. The at least three metal nanoparticles comprise a highly conductive material. In one embodiment, the at least three metal nanoparticles comprise metal such as silver (Ag), gold (Au), aluminum (Al), tungsten (W), titanium (Ti), platinum (Pt), rhodium (Rh), copper (Cu) and tin (Sn). In addition, the at least three metal nanoparticles may comprise highly conductive materials including alloys such as 99% Al-1% silicon (Si), Rh—Al, indium tin oxide (ITO), tin oxide, titanium silicide, and the like. Metal nanoparticle structure 510 further includes a light-transparent medium situated over the substrate of MNP PBG device in SOI 500. The light-transparent medium can help to structurally stabilize the at least three metal nanoparticles. In one embodiment, the light-transparent medium comprises dielectric material such as oxides (indium tin oxide (ITO), tin oxide, silica ($SiO_2$), alumina ($Al_2O_3$), titanium oxide ($TiO_2$), tantalum oxide ($Ta_2O_5$), and fluorides (calcium fluoride ($CaF_2$), magnesium fluoride ($MgF_2$), lanthanum fluoride ($LaF_3$), aluminum fluoride ($AlF_3$)). Other light-transparent medium may include transparent polyimides (see for example U.S. Pat. No. 6,232,428 entitled, "Essentially colorless, transparent polyimide coatings and films" by G. L. Deets et al., issued May 15, 2001). As shown in FIG. 5, light rays 592 input to MNP structure 510. MNP structure 510 amplifies light rays 592 and outputs amplified light 594. Amplified light 594 travels along crystal defect regions 440 as described above. Amplified light 594 outputs from 3D PBG device 400 to electronic component 520.

Figure 6:
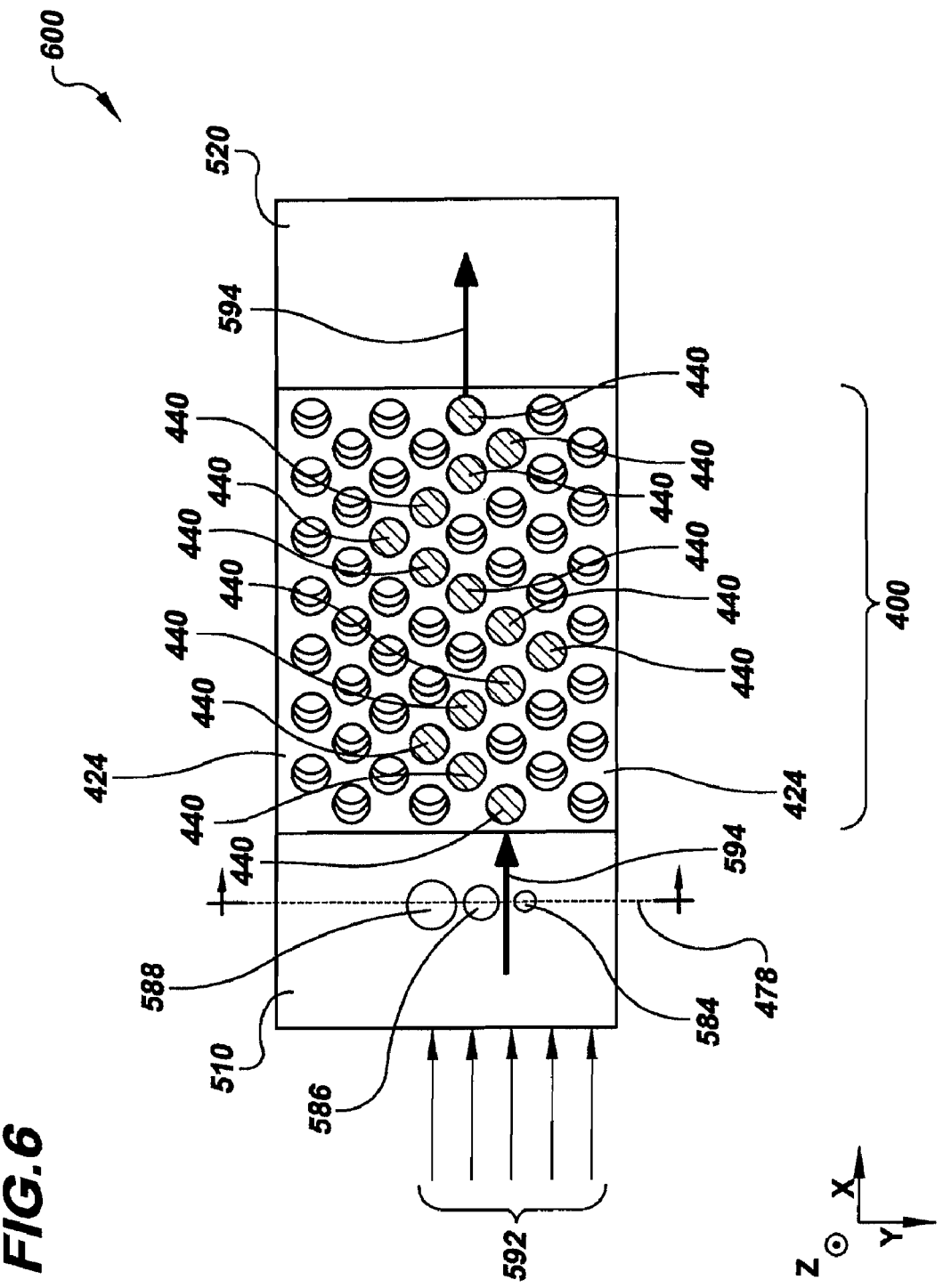
FIG. 6 is a top view of an embodiment of a metal nanoparticle photonic bandgap device in SOI.
Figure 7A:
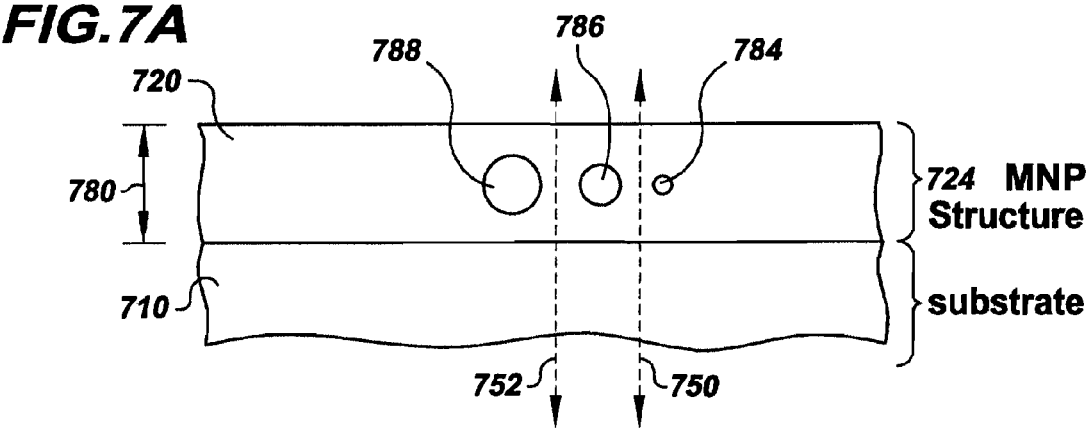
FIG. 7A is a front view of a cut-away section along the Y-Z plane of the metal nanoparticle structure of FIG. 6 along line 478 of FIG. 6.

FIG. 6 is a top view of an embodiment of a metal nanoparticle photonic bandgap device in SOI. FIG. 6 is substantially similar to FIG. 5, and thus, similar components are not described hereinagain. As shown in FIG. 6, MNP structure 510 includes small metal nanoparticle 584, medium metal nanoparticle 586 and large metal nanoparticle 588. Light rays 592 are amplified between small metal nanoparticle 584 and medium metal nanoparticle 586. This amplification depends on the ratio of radii between the spherical metal nanoparticles (i.e., small metal nanoparticle 584, medium metal nanoparticle 586 and large metal nanoparticle 588) and the distances between the spherical metal nanoparticles. The following Equation 1 represents a desired ratio of radii between adjacent metal nanoparticles.

$$K = (R_{i+1})/(R_i) = 1/3; \quad \text{(Equation 1)}$$

where K=desired ratio of radii between adjacent metal nanoparticles;
$R_{i+1}$=radius of a smaller, adjacent nanoparticle
$R_i$=radius of a larger, adjacent nanoparticle Those skilled in the art shall recognize that other ratios of radii between adjacent metal nanoparticles may be used with the present MNP PBG device in SOI without departing from the scope or spirit of the device. A desired distance between spheres can be calculated by considering the desired spectral maximum of the field enhancement. A field enhancement of an initial field energy, $E_0$, between adjacent metal nanoparticles can be represented by the following Equation 2.

$$E_i = Q * E_0 >> E_0 \quad \text{(Equation 2)}$$

where $E_i$=field enhancement of an initial field energy, $E_0$;
Q=resonance quality factor, which is a function of the dielectric constant of the metal;
$E_0$=initial field energy;

FIG. 7A is a front view of a cut-away section along the Y-Z plane of the MNP structure of FIG. 6 along line 478 of FIG. 6. As shown in FIG. 7A, MNP structure 724 includes light-transparent medium 720, small metal nanoparticle 784, medium metal nanoparticle 786 and large metal nanoparticle 788. Small metal nanoparticle 784, medium metal nanoparticle 786 and large metal nanoparticle 788 of FIG. 7 are analogous to small metal nanoparticle 584, medium metal nanoparticle 586 and large metal nanoparticle 588, respectively, of FIG. 6. Small metal nanoparticle 784, medium metal nanoparticle 786 and large metal nanoparticle 788 of MNP structure 724 have a three-element, single-ascending configuration, where the metal nanoparticles are situated in order according to ascending size. MNP structure 724 has height 780 and is situated over substrate 710. Light entering MNP structure 724 is amplified along lines 750 and 752, where amplification along line 750 is greater than amplification along line 752.

Figure 7B:
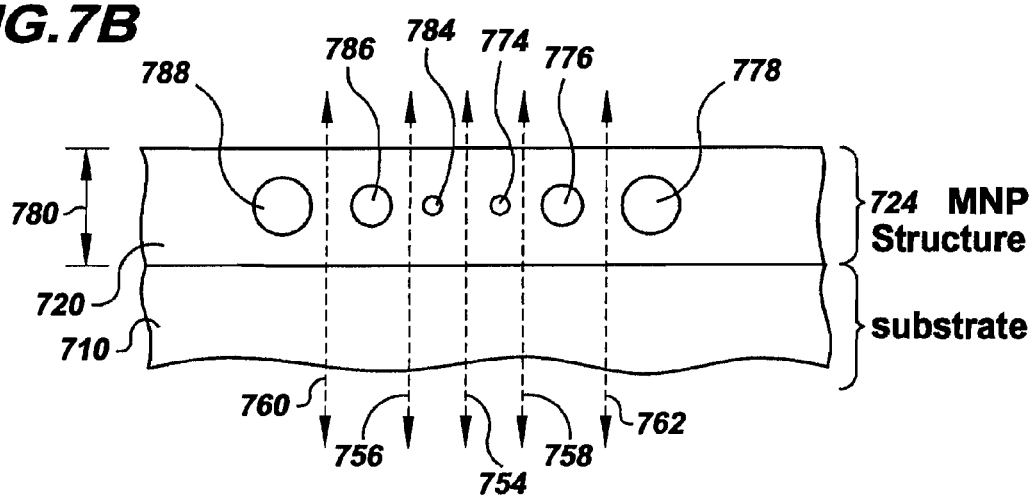
FIG. 7B is a front view of one embodiment of a metal nanoparticle structure of FIG.

FIG. 7B is a front view of one embodiment of a MNP structure of FIG. 5. As shown in FIG. 7B, MNP structure 724 includes light-transparent medium 720, small metal nanoparticles 784, 774, medium metal nanoparticles 786, 776 and large metal nanoparticles 788, 778. Small metal nanoparticles 784, 774, medium metal nanoparticles 786, 776 and large metal nanoparticles 788, 778 of FIG. 7 are analogous to small metal nanoparticle 584, medium metal nanoparticle 586 and large metal nanoparticle 588, respectively, of FIG. 6. Small metal nanoparticles 784, 774, medium metal nanoparticles 786, 776 and large metal nanoparticles 788, 778 of MNP structure 724 have a six-element, double-ascending configuration, where the metal nanoparticles are situated in order according to ascending size on both sides of the smallest metal nanoparticles with the smallest metal nanoparticles at the center of the configuration. Light entering MNP structure 724 is amplified along lines 754, 756, 758, 760, 762, where amplification along line 754 is greater than amplification along lines 756, 758, and amplification along lines 756, 758 is greater than amplification along lines 760, 762.

Figure 7C:
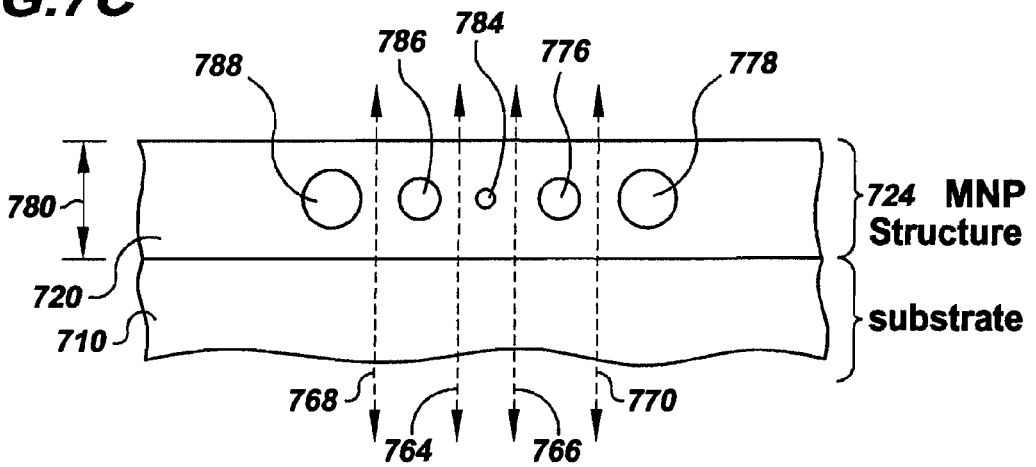
FIG. 7C is a front view of one embodiment of a metal nanoparticle structure of FIG. 5.

FIG. 7C is a front view of one embodiment of a MNP structure of FIG. 5. As shown in FIG. 7C, MNP structure 724 includes light-transparent medium 720, small metal nanoparticle 784, medium metal nanoparticles 786, 776 and large metal nanoparticles 788, 778. Small metal nanoparticle 784, medium metal nanoparticles 786, 776 and large metal nanoparticles 788, 778 of MNP structure 724 have a five-element, double-ascending configuration, where the metal nanoparticles are situated in order according to ascending size on both sides of the smallest metal nanoparticle with the smallest metal nanoparticle at the center of the configuration. Light entering MNP structure 724 is amplified along lines 764, 766, 768, 770, where amplification along lines 764, 766 is greater than amplification along lines 768, 770.

Embodiments of a MNP PBG device in SOI having three, five and six metal nanoparticles have been described above. Those skilled in the art shall recognize that other embodiments of metal nanoparticles may be used with the present MNP PBG device in SOI without departing from the scope or spirit of the device. E.g., embodiments having four, seven, eight, nine, ten and more may be used with the present MNP PBG device in SOI without departing from the scope or spirit of the device.

Figure 8A:
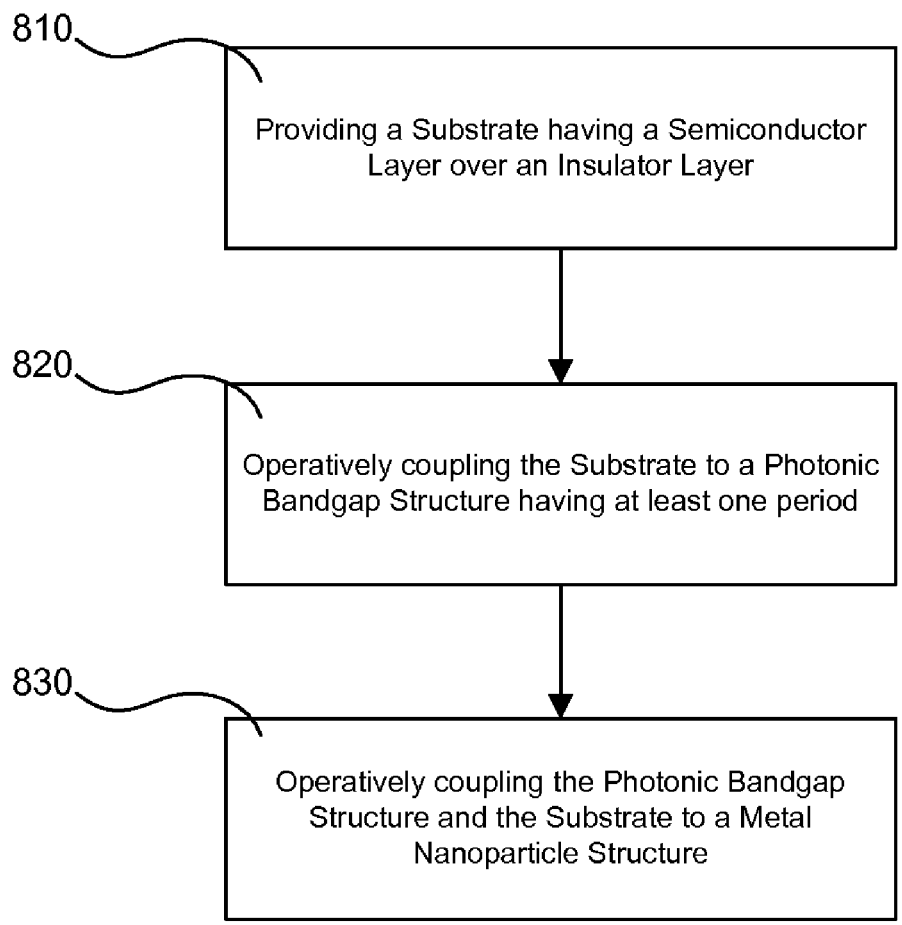
FIG. 8A is a flowchart of an exemplary method of manufacturing one embodiment of a MNP PBG device in SOI.

FIG. 8A is a flowchart of an exemplary method of manufacturing one embodiment of a MNP PBG device in SOI.

While boxes 810 through 830 shown in flowchart 800 are sufficient to describe one embodiment of an exemplary method of manufacturing one embodiment of a MNP PBG device in SOI, other embodiments may utilize procedures different from those shown in flowchart 800.

Referring to FIG. 8A, at Procedure 810 in flowchart 800, the method provides a substrate having a semiconductor layer over an insulator layer. After Procedure 810, the method proceeds to Procedure 820. At Procedure 820 in flowchart 800, the method operatively couples the substrate to a photonic bandgap structure having at least one period, wherein the photonic bandgap structure is adapted to receive and output light along a predetermined path. After Procedure 820, the method proceeds to Procedure 830. At Procedure 830 in flowchart 800, the method operatively couples the photonic bandgap structure and the substrate to a metal nanoparticle structure comprising at least three metal nanoparticles having spherical shapes of different radii, wherein the at least three metal nanoparticles are adapted to receive and amplify light rays and output amplified light. After Procedure 830, the method ends.

In one embodiment of the method of flowchart 800, the photonic bandgap structure comprises a structure selected from the group consisting of 2D photonic bandgap structure, 3D photonic bandgap structure and 3D photonic bandgap structure having a funnel waveguide configuration. In one embodiment of the method of flowchart 800, a desired ratio of radii between adjacent metal nanoparticles is represented by Equation 1. In one embodiment of the method of flowchart 800, a desired distance between spheres is calculated by considering the desired spectral maximum of the field enhancement.

In one embodiment of the method of flowchart 800, the metal nanoparticle structure comprises a three-element, single-ascending configuration. In one embodiment of the method of flowchart 800, the metal nanoparticle structure comprises a six-element, double-ascending configuration. In one embodiment of the method of flowchart 800, the metal nanoparticle structure comprises a five-element, double-ascending configuration. In one embodiment of the method of flowchart 800, the metal nanoparticle structure comprises at least three metal nanoparticles having spherical shapes and a light-transparent medium.

In one embodiment of the method of flowchart 800, the at least three metal nanoparticles comprise a highly conductive material selected from the group consisting of silver (Ag), gold (Au), aluminum (Al), tungsten (W), titanium (Ti), platinum (Pt), rhodium (Rh), copper (Cu), tin (Sn), 99% Al-1% silicon (Si), Rh—Al, indium tin oxide (ITO), tin oxide, and titanium silicide. In one embodiment of the method of flowchart 800, the light-transparent medium comprises a dielectric material selected from the group consisting of indium tin oxide (ITO), tin oxide, silica ($SiO_2$), alumina ($Al_2O_3$), titanium oxide ($TiO_2$), tantalum oxide ($Ta_2O_5$), calcium fluoride ($CaF_2$), magnesium fluoride ($MgF_2$), lanthanum fluoride ($LaF_3$), aluminum fluoride ($AlF_3$) and transparent polyimides. In one embodiment of the method of flowchart 800, the method further comprises a procedure of operatively coupling the photonic bandgap structure and the substrate to at least one electronic component adapted to receive amplified light.

Figure 8B:
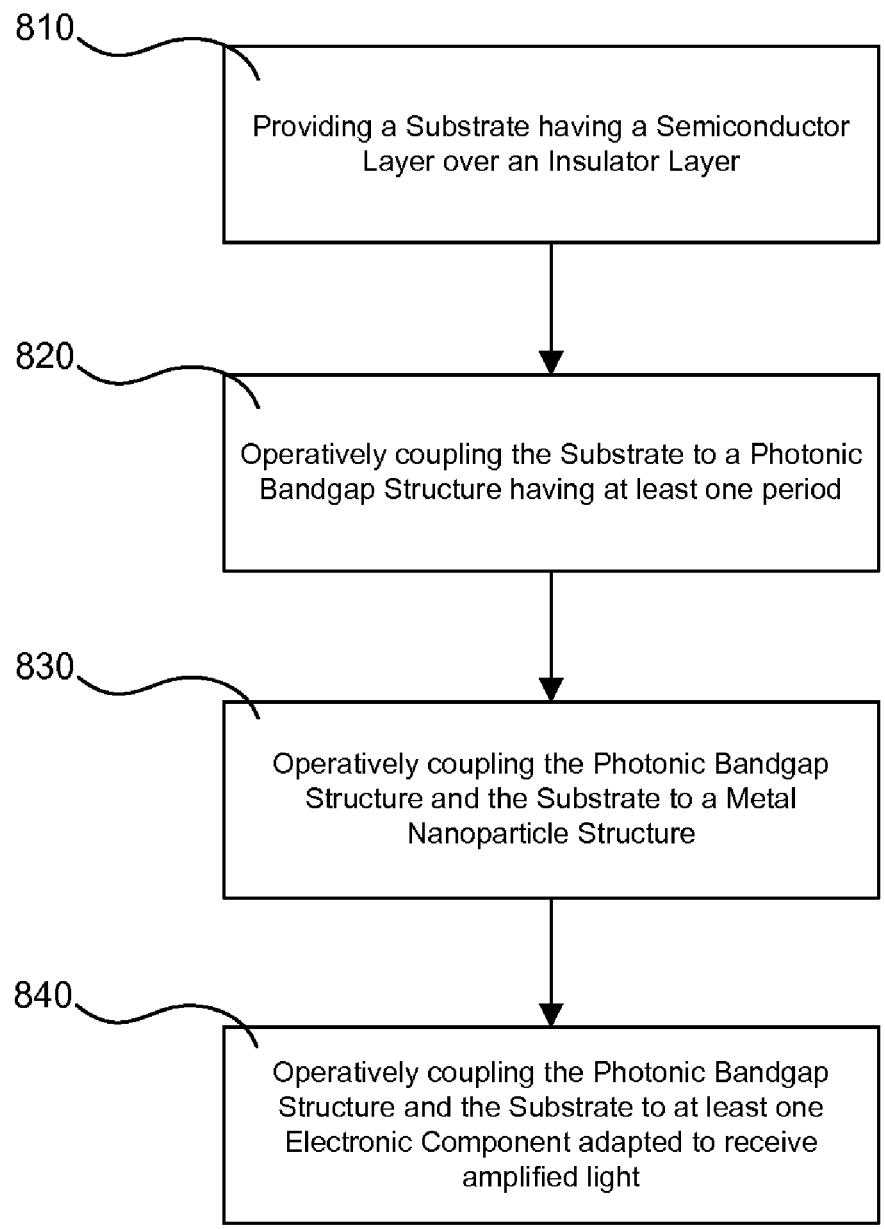
FIG. 8B is a flowchart of an exemplary method of manufacturing one embodiment of a MNP PBG device in SOI.

FIG. 8B is a flowchart of an exemplary method of manufacturing one embodiment of a MNP PBG device in SOI. FIG. 8B is substantially similar to FIG. 8A, and thus, similar procedures are not described in detail. While boxes 810 through 840 shown in flowchart 802 are sufficient to describe one exemplary method of manufacturing one embodiment of a MNP PBG device in SOI, other embodiments may utilize procedures different from those shown in flowchart 802.

Referring to FIG. 8B, at Procedure 810 in flowchart 802, the method provides a substrate having a semiconductor layer over an insulator layer. After Procedure 810, the method proceeds to Procedure 820. At Procedure 820 in flowchart 802, the method operatively couples the substrate to a photonic bandgap structure having at least one period, wherein the photonic bandgap structure is adapted to receive and output light along a predetermined path. After Procedure 820, the method proceeds to Procedure 830. At Procedure 830 in flowchart 802, the method operatively couples the photonic bandgap structure and the substrate to a metal nanoparticle structure comprising at least three metal nanoparticles having spherical shapes of different radii, wherein the at least three metal nanoparticles are adapted to receive and amplify light rays and output amplified light. Procedure 830, the method proceeds to Procedure 840. At Procedure 840 in flowchart 802, the method operatively couples the photonic bandgap structure and the substrate to at least one electronic component adapted to receive amplified light. After Procedure 840, the method ends.

In one embodiment of the method of flowchart 802, the metal nanoparticle structure comprises a three-element, single-ascending configuration. In one embodiment of the method of flowchart 802, the metal nanoparticle structure comprises a six-element, double-ascending configuration. In one embodiment of the method of flowchart 802, the metal nanoparticle structure comprises a five-element, double-ascending configuration. In one embodiment of the method of flowchart 802, the metal nanoparticle structure comprises at least three metal nanoparticles having spherical shapes and a light-transparent medium.

In one embodiment of the method of flowchart 802, the at least three metal nanoparticles comprise a highly conductive material selected from the group consisting of silver (Ag), gold (Au), aluminum (Al), tungsten (W), titanium (Ti), platinum (Pt), rhodium (Rh), copper (Cu), tin (Sn), 99% Al-1% silicon (Si), Rh—Al, indium tin oxide (ITO), tin oxide, and titanium silicide. In one embodiment of the method of flowchart 802, the light-transparent medium comprises a dielectric material selected from the group consisting of indium tin oxide (ITO), tin oxide, silica ($SiO_2$), alumina ($Al_2O_3$), titanium oxide ($TiO_2$), tantalum oxide ($Ta_2O_5$), calcium fluoride ($CaF_2$), magnesium fluoride ($MgF_2$), lanthanum fluoride ($LaF_3$), aluminum fluoride ($AlF_3$) and transparent polyimides.

Figure 9:
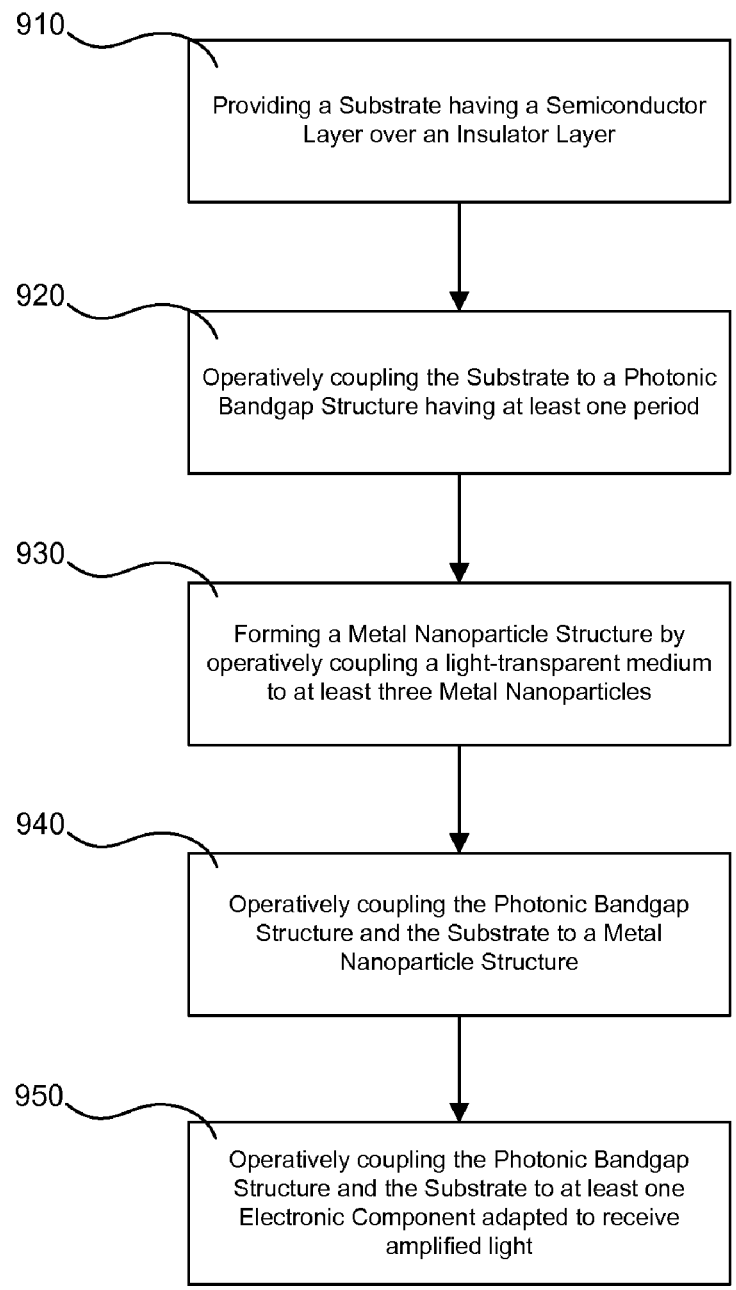
FIG. 9 is a flowchart of an exemplary method of manufacturing one embodiment of a MNP PBG device in SOI.

FIG. 9 is a flowchart of an exemplary method of manufacturing one embodiment of a MNP PBG device in SOI. While boxes 910 through 950 shown in flowchart 900 are sufficient to describe one exemplary method of manufacturing one embodiment of a MNP PBG device in SOI, other embodiments may utilize procedures different from those shown in flowchart 900.

Referring to FIG. 9, at Procedure 910 in flowchart 900, the method provides a substrate having a semiconductor layer over an insulator layer. After Procedure 910, the method proceeds to Procedure 920. At Procedure 920 in flowchart 900, the method operatively couples the substrate to a photonic bandgap structure having at least one period, wherein the photonic bandgap structure is adapted to receive and output light along a predetermined path. After Procedure 920, the method proceeds to Procedure 930. At Procedure 930 in flowchart 900, the method forms a metal nanoparticle structure by operatively coupling a light-transparent medium adapted to receive light rays and output light to at least three metal nanoparticles having spherical shapes of different radii, wherein the at least three metal nanoparticles are adapted to receive and amplify light rays and output amplified light. After Procedure 930, the method proceeds to Procedure 940.

At Procedure 940 in flowchart 900, the method operatively couples the photonic bandgap structure and the substrate to a metal nanoparticle structure. After Procedure 940, the method proceeds to Procedure 950. At Procedure 950 in flowchart 900, the method operatively couples the photonic bandgap structure and the substrate to at least one electronic component adapted to receive amplified light. After Procedure 950, the method ends.

What is claimed:

1. A method, comprising:
   providing a substrate having a semiconductor layer over an insulator layer:
   operatively coupling said substrate to a photonic bandgap structure having at least one period, wherein said photonic bandgap structure is adapted to receive and output light along a predetermined path; and
   operatively coupling said photonic bandgap structure and said substrate to a metal nanoparticle structure comprising at least three metal nanoparticles having spherical shapes of different radii, wherein said at least three metal nanoparticles are adapted to receive and amplify light rays and output amplified light.

2. The method of claim 1, wherein said photonic bandgap structure comprises a structure selected from the group consisting of 2D photonic bandgap structure, 3D photonic bandgap structure and 3D photonic bandgap structure having a funnel waveguide configuration.

3. The method of claim 1, wherein a desired ratio of radii between adjacent metal nanoparticles is represented by the following equation:

$$K=(R_{i+1})/(R_i)=\frac{1}{3};$$

where K=desired ratio of radii between adjacent metal nanoparticles;
$R_{i+1}$=radius of a smaller, adjacent nanoparticle
$R_i$=radius of a larger, adjacent nanoparticle.

4. The method of claim 1, wherein a desired distance between spheres is calculated by considering the desired spectral maximum of the field enhancement.

5. The method of claim 1, wherein said metal nanoparticle structure comprises a three-element, single-ascending configuration.

6. The method of claim 1, wherein said metal nanoparticle structure comprises a six-element, double-ascending configuration.

7. The method of claim 1, wherein said metal nanoparticle structure comprises a five-element, double-ascending configuration.

8. The method of claim 1, wherein said metal nanoparticle structure comprises at least three metal nanoparticles having spherical shapes and a light-transparent medium.

9. The method of claim 1, wherein said at least three metal nanoparticles comprise a highly conductive material selected from the group consisting of silver (Ag), gold (Au), aluminum (Al), tungsten (W), titanium (Ti), platinum (Pt), rhodium (Rh), copper (Cu), tin (Sn), 99% Al-1% silicon (Si), Rh—Al, indium tin oxide (ITO), tin oxide, and titanium silicide.

10. The method of claim 1, wherein said light-transparent medium comprises a dielectric material selected from the group consisting of indium tin oxide (ITO), tin oxide, silica ($SiO_2$), alumina ($Al_2O_3$), titanium oxide ($TiO_2$), tantalum oxide ($Ta_2O_5$), calcium fluoride ($CaF_2$), magnesium fluoride ($MgF_2$), lanthanum fluoride ($LaF_3$), aluminum fluoride ($AlF_3$) and transparent polyimides.

11. The method of claim 1, further comprising a procedure of operatively coupling at least one electronic component to said photonic bandgap structure and said substrate, adapted to receive amplified light.

12. A method, comprising:
   providing a substrate having a semiconductor layer over an insulator layer:
   operatively coupling said substrate to a photonic bandgap structure having at least one period, wherein said photonic bandgap structure is adapted to receive and output light along a predetermined path;
   operatively coupling said photonic bandgap structure and said substrate to a metal nanoparticle structure comprising at least three metal nanoparticles having spherical shapes of different radii, wherein said at least three metal nanoparticles are adapted to receive and amplify light rays and output amplified light; and
   operatively coupling said photonic bandgap structure and said substrate to at least one electronic component adapted to receive amplified light.

13. The method of claim 12, wherein said metal nanoparticle structure comprises a three-element, single-ascending configuration.

14. The method of claim 12, wherein said metal nanoparticle structure comprises a six-element, double-ascending configuration.

15. The method of claim 12, wherein said metal nanoparticle structure comprises a five-element, double-ascending configuration.

16. The method of claim 12, wherein said metal nanoparticle structure comprises at least three metal nanoparticles having spherical shapes and a light-transparent medium.

17. The method of claim 12, wherein said at least three metal nanoparticles comprise a highly conductive material selected from the group consisting of silver (Ag), gold (Au), aluminum (Al), tungsten (W), titanium (Ti), platinum (Pt), rhodium (Rh), copper (Cu), tin (Sn), 99% Al-1% silicon (Si), Rh—Al, indium tin oxide (ITO), tin oxide, and titanium silicide.

18. The method of claim 12, wherein said light-transparent medium comprises a dielectric material selected from the group consisting of indium tin oxide (ITO), tin oxide, silica ($SiO_2$), alumina ($Al_2O_3$), titanium oxide ($TiO_2$), tantalum oxide ($Ta_2O_5$), calcium fluoride ($CaF_2$), magnesium fluoride ($MgF_2$), lanthanum fluoride ($LaF_3$), aluminum fluoride ($AlF_3$) and transparent polyimides.

19. A method, comprising:
   providing a substrate having a semiconductor layer over an insulator layer:
   operatively coupling said substrate to a photonic bandgap structure having at least one period, wherein said photonic bandgap structure is adapted to receive and output light along a predetermined path;
   forming a metal nanoparticle structure by operatively coupling a light-transparent medium adapted to receive light rays and output light to at least three metal nanoparticles having spherical shapes of different radii, wherein said at least three metal nanoparticles are adapted to receive and amplify light rays and output amplified light;
   operatively coupling said photonic bandgap structure and said substrate to said metal nanoparticle structure; and
   operatively coupling said photonic bandgap structure and said substrate to at least one electronic component adapted to receive amplified light.

* * * * *